United States Patent [19]

Maezawa et al.

[11] 4,219,723
[45] Aug. 26, 1980

[54] AUTOMATIC WELDING MACHINE WITH THREE-DIMENSIONAL CAM DRIVEN MOTION

[75] Inventors: Nobuji Maezawa, Sayama; Tadashi Takeo, Sakado; Shogo Ozawa, Iruma, all of Japan

[73] Assignee: Honda Giken Kogyo Kabushiki Kaisha, Tokyo, Japan

[21] Appl. No.: 939,975

[22] Filed: Sep. 6, 1978

[30] Foreign Application Priority Data

Sep. 10, 1977 [JP] Japan .................. 52/122196[U]
Oct. 15, 1977 [JP] Japan .................. 52/138412[U]
Oct. 15, 1977 [JP] Japan .................. 52/138413[U]
Oct. 15, 1977 [JP] Japan .................. 52/138414[U]

[51] Int. Cl.² ............................. B23K 9/12
[52] U.S. Cl. ..................... 219/125.1; 219/124.1; 219/124.33; 228/32
[58] Field of Search ........... 219/124.1, 124.21, 124.33, 219/125.1, 86.33, 86.7; 228/25, 32; 74/29, 30

[56] References Cited

U.S. PATENT DOCUMENTS

| | | | |
|---|---|---|---|
| 1,521,361 | 12/1924 | Davis | 219/124.1 X |
| 2,438,262 | 3/1948 | Watkin | 219/86.7 X |
| 3,609,289 | 9/1971 | Hathaway | 219/124.1 |
| 3,665,148 | 5/1972 | Yasenchak et al. | 219/86.33 X |
| 3,675,841 | 7/1972 | Gutlhuber et al. | 219/125.1 X |
| 3,777,581 | 12/1973 | Sartori | 74/29 X |
| 3,938,722 | 2/1976 | Kelly et al. | 228/32 X |

FOREIGN PATENT DOCUMENTS

759044* 10/1956 United Kingdom .................. 228/32

Primary Examiner—Roy N. Envall, Jr.
Assistant Examiner—Keith E. George
Attorney, Agent, or Firm—Polster, Polster and Lucchesi

[57] ABSTRACT

An automatic welding machine of a type, in which a welding torch is subjected to predetermined three-dimensional locus motions by means of three profile cams for controlling movement of the torch in the left-and-right, up-and-down, and front-and-back directions in accordance with predetermined programs set in the machine, the machine being constructed with (a) a driving section including a frame to support component members thereon, a shaft rotatably held on the frame, an electric motor axially fitted at one end of the shaft, a plurality of profile cams fixedly provided on the other end part of the shaft so as to be rotated therewith, the cams being arranged with an appropriate space interval between them, and cam follower members corresponding in number to the profile cams and intimately contacted with the cams to move in accordance with rotational movement of the cams; and (b) a driven section including a frame to support component members thereon, a plurality of movable members in the left-and-right, up-and-down, and front-and-back directions in pursuance of driving force transmitted from corresponding profile cams via the cam followers in the driving section, power transmission means to transmit the driving force from each of the cam follower members in the driving section to each of the movable members in the designated direction, a welding torch slidably fitted in one of the movable member to perform up-and-down movement, the torch being fitted through a rotatable cylindrical member in the movable member, and an electric motor to tilt the torch through a linking means extended between the motor and the rotatable cylindrical member.

7 Claims, 6 Drawing Figures

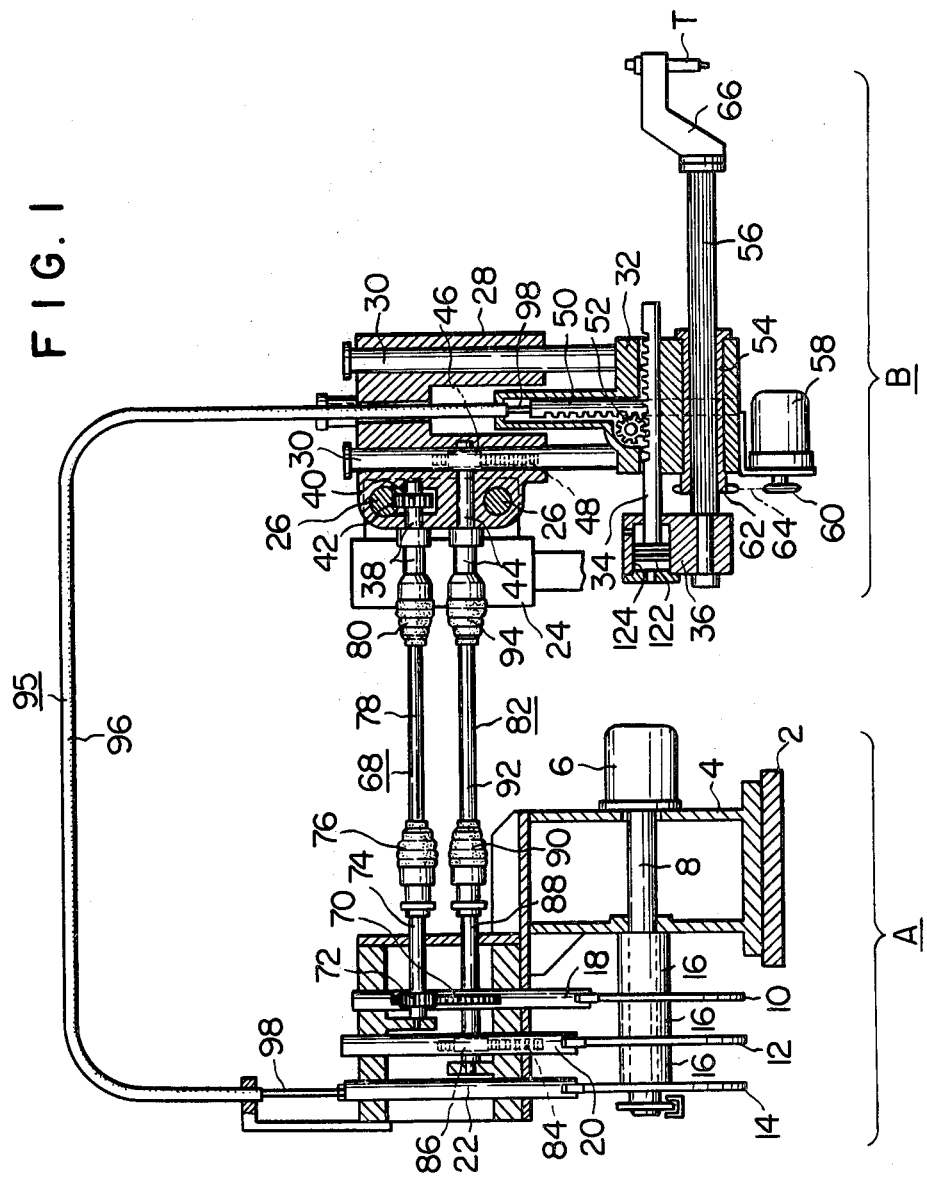

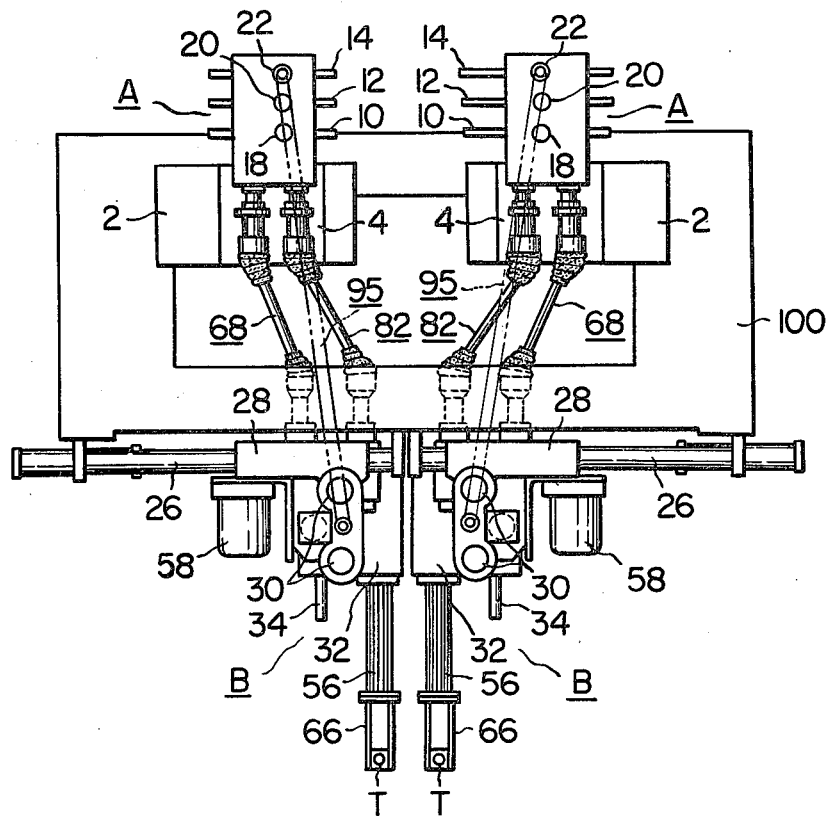
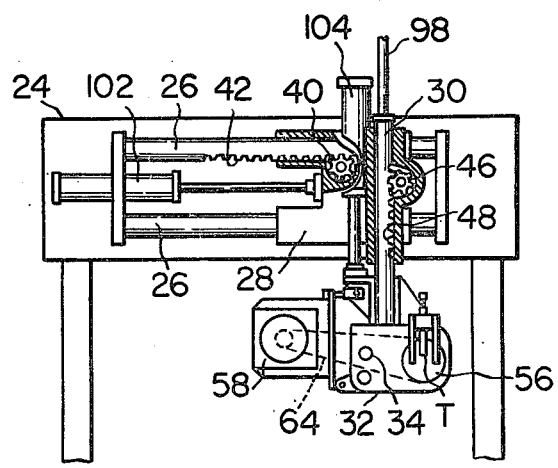

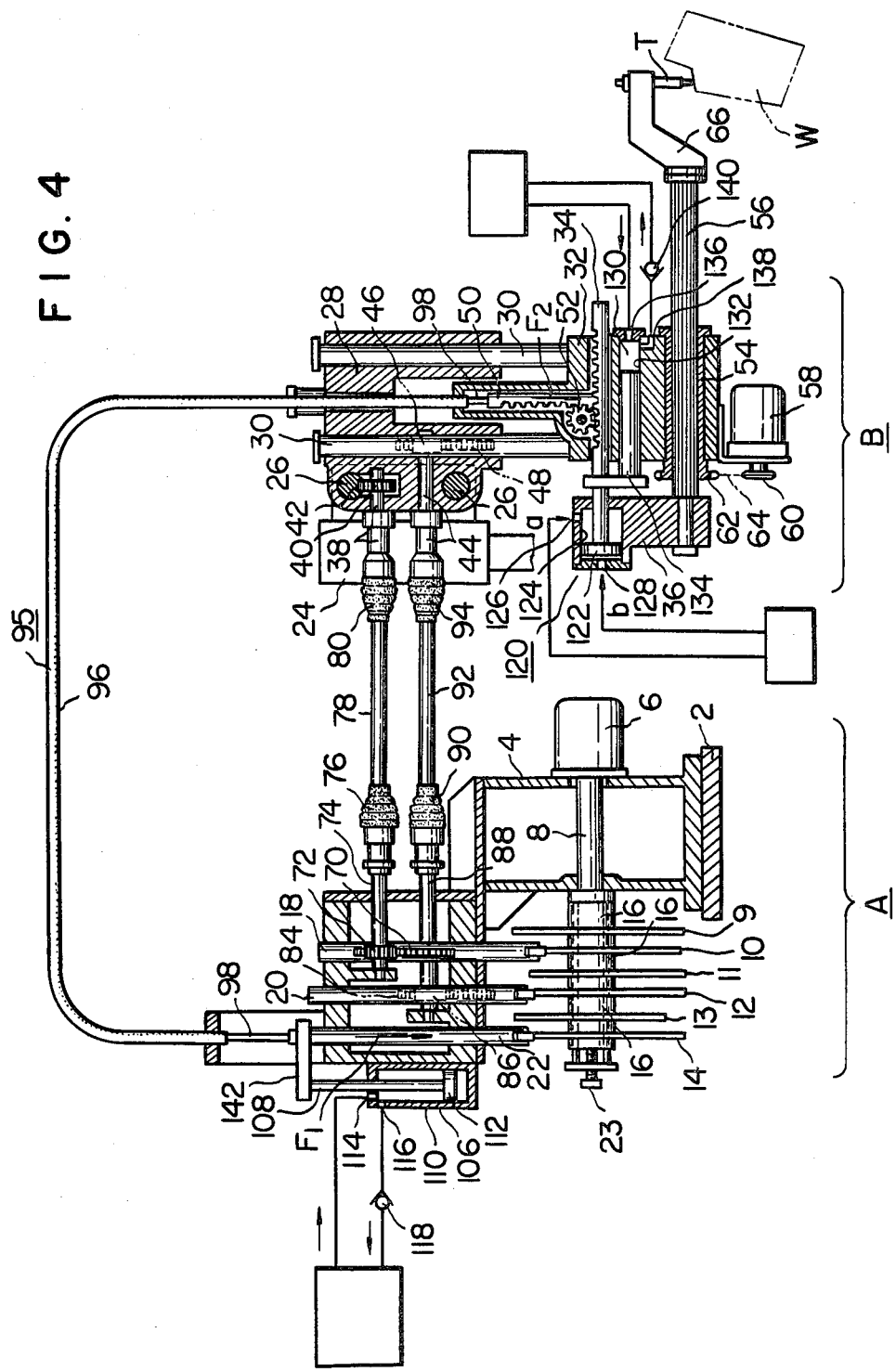

AUTOMATIC WELDING MACHINE WITH THREE-DIMENSIONAL CAM DRIVEN MOTION

BACKGROUND OF THE INVENTION

This invention relates to an automatic welding machine, and, more particularly, it is concerned with the automatic welding machine of a type which causes a welding torch to perform three dimensional locus motions by the use of three profile cams for controlling directional movements of the welding torch in the left-and-right, up-and-down, and front-and-back directions.

It is a primary object of the present invention to provide an automatic welding machine of a type, in which a welding torch supporting and moving mechanism, i.e., a driven mechanism to cause the welding torch to perform the three dimensional locus motions when it receives drive power from a driving mechanism consisting of a prime mover, profile cams, and so forth, is constructed in a freely movable manner in a relative position with respect to the driving mechanism. In such construction, it becomes possible to collectively move and position a plurality of welding torch supporting and moving mechanisms (driven section) of a plurality of same type of welding machines so as to readily effect the multi-welding operations within a limited narrow space region.

It is a secondary object of the present invention to provide an automatic welding machine of a type, wherein a driven member is connected to a cam follower member which correspondingly move in contact with a profile cam to be driven whereby, in which reinstatement of the profile cams to their original positions and their change-over from one to the other can be done easily.

It is a third object of the present invention to provide an automatic welding machine of a type, wherein forward and backward motion of a follower member is transmitted to a driven member by connecting the cam follower member correspondingly moving in accordance with the profile cam with the driven member through an inner wire in a flexible outer tube, and in which the flexible cable is prevented from buckling.

It is a fourth object of the present invention to provide an automatic welding machine of a type, in which a welding torch of a driven mechanism is automatically moved in accordance with a predetermined program of a driving mechanism, and in which the welding torch may be easily taken away from a work piece as necessity arises.

According to the present invention, in one aspect thereof, there is provided an automatic welding machine which comprises in combination: (a) a driving section including a frame to support component members thereon, a shaft rotatably held on said frame, an electric motor axially fitted at one end of said shaft, a plurality of profile cams fixedly provided on the other end part of said shaft to be rotated therewith, said profile cams being arranged with an appropriate space interval between them, cam follower members corresponding in number to said profile cams and intimately contacted therewith to move in accordance with rotational movement of said profile cams; and (b) a driven section including a frame to support component members thereon, a plurality of movable members in the left-and-right, up-and-down, and front-and-back directions in pursuance of driving force transmitted from corresponding profile cams via cam follower members in said driven section, power transmission means to transmit the driving force from each of said cam follower members in said driving section to each of said movable members in the designated direction, a welding torch slidably fitted in one of said movable member to perform up-and-down movement, said torch being fitted through a rotatable cylindrical member in said movable member, an electric motor to tilt said torch through a linking means extended between said motor and said rotatable cylindrical member.

According to the present invention in another aspect thereof, there is provided an automatic welding machine, in which the power transmission device for the movable members comprises gear means, drive shafts, and universal joints.

According to the present invention in still another aspect thereof, there is provided an automatic welding machine, in which the power transmission device for the movable member comprises a flexible cable composed of an outer tube and an inner wire inserted in said outer tube and connecting at both ends thereof said cam follower member in said driving section and said movable members in said driven section.

According to the present invention, in further aspect thereof, there is provided an automatic welding machine, in which there is further provided a hydraulic pressure cylinder to maintain said cam follower member to constantly push said profile cam to secure intimate contact between said cam follower member and said profile cam so that said cam follower member may be separated from said profile cam by inversely operating said hydraulic pressure cylinder at the time of returning of said profile cam to its original position or changing over of said cam from one to the other.

According to the present invention, in still further aspect thereof, there is provided an automatic welding machine, in which there is further provided a pulling mechanism on said cam follower member to constantly pull said cam follower toward said profile cam, and there is further provided a tensioning mechanism to impart a tension to any of the movable members in said driven section with a force which is smaller than the force imparted to pull said cam follower member toward said cam and in the direction opposite to the pulling direction, thereby imparting a constant tension to said inner wire connecting said cam follower member and said movable member.

According to the present invention, in other aspect thereof, there is provided an automatic welding machine, in which said torch is held at one end thereof on said front-and-back moving member in a manner to be able to freely determine the sliding position thereof independently of said power transmission means provided in said movable member in parallel with said torch to move said movable member.

There has thus been outlined, rather broadly, the more important features of the present invention in order that the detailed description thereof that follows may be better understood, and in order that the present contribution to the art may be better appreciated. There are, of course, additional features of the invention that will be described hereinafter and which form the subject of the claims appended hereto. Those skilled in the art will appreciate that the conception, upon which this disclosure is based may readily be utilized as a basis for the designing of other structures for carrying out the several purposes of the present invention. It is important, therefore, that the claims be regarded as including such equivalent constructions so far as they do not depart from the spirit and scope of the present invention.

BRIEF DESCRIPTION OF THE ACCOMPANYING DRAWINGS

Specific embodiments of the present invention have been chosen for the purposes of illustration and description, and are shown in the accompanying drawings, forming a part of the specification, in which:

FIG. 1 is a side elevational view, partly in cross-section, showing one embodiment of the automatic welding machine according to the present invention;

FIGS. 2 and 3 are respectively a plan view and a front view of the automatic welding machine according to the present invention, in which a plurality of units of the automatic welding machine in the same kind are mounted on a common mounting frame to enable multi-welding operations to be carried out in a limited space;

FIG. 4 is also a side elevational view partly in cross-section of another embodiment according to the present invention; and FIG. 5 is a front view, partly cut away, of the automatic welding machine according to the present invention.

DETAILED DESCRIPTION OF PREFERRED EMBODIMENTS

Figure 3:
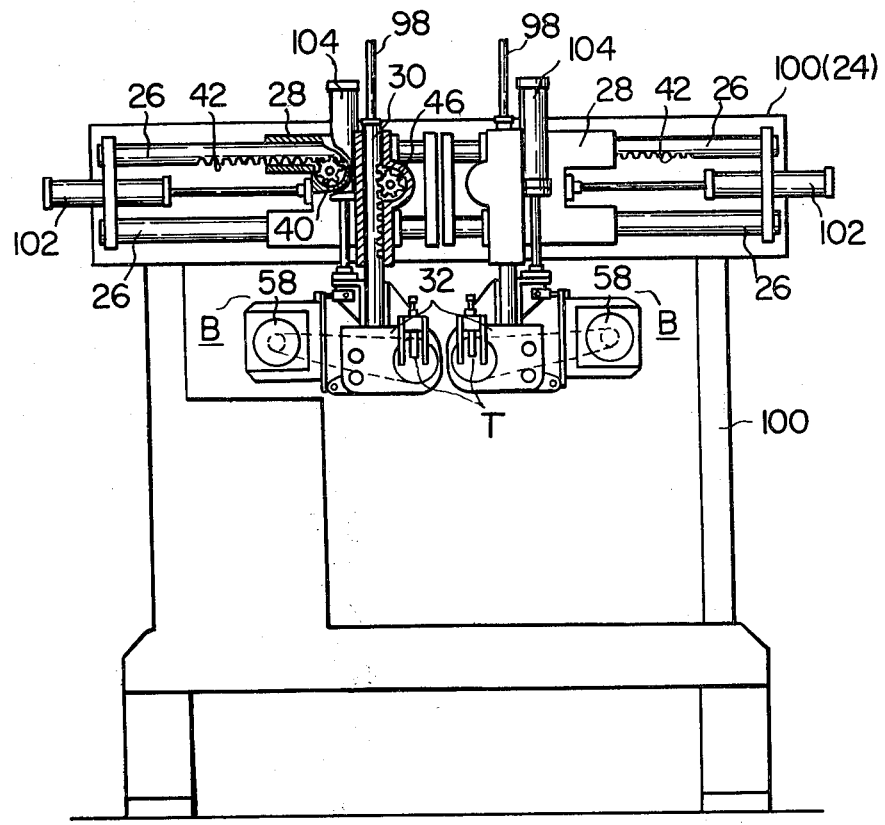

In the following, preferred embodiments of the automatic welding machine according to the present invention will be described in reference to the accompanying drawing.

Referring first to FIG. 1, the driving mechanism A is constructed with a base 2, a supporting frame 4 integral with the base 2, an electric motor 6 as a prime mover, the motor being mounted and held on one side wall of the supporting frame 4, a rotational shaft 8 extending from the motor 6, three pieces of profile cams 10, 12 and 14 for controlling the moving directions of the welding torch in the left-and-right, up-and-down, and front-and-back directions, respectively, the profile cams being sequentially mounted and fixed on the rotational shaft 8 extending from the motor 6 so as to be integrally rotatable therewith, a plurality of cylindrical spacers 16 interposed between the adjacent profile cams with an appropriate space interval between them, and three cam follower members 18, 20 and 22 which are in constant contact with the profile cams 10, 12 and 14, respectively, and move in the up-and-down direction in accordance with the profiles of the cams 10, 12 and 14, while they are rotating.

On the other hand, the welding torch supporting and moving mechanism (or driven mechanism) B, which causes the welding torch T to perform the three dimensional movements by being subjected to the motions of the three follower members 18, 20 and 22 in the above-described driving mechanism A, is constructed with a left-and-right moving block which is supported on a supporting frame 24 in a freely slidable manner in the left-and-right direction (normal to the surface of the drawing) along railing members 26, 26 integral with the supporting frame 24, and up-and-down moving block 32 fitted onto the left-and-right moving block 28 in a freely movable manner in the up-and-down direction along sliding levers 30, 30 freely slidable in the up-and-down direction with respect to the block 28, and a front-and-back moving block 36 fitted in a freely movable manner in the forward and backward directions with respect to the up-and-down moving block 32 through a forward and backward moving racked bar 34.

The left-and-right moving block 28 is provided with a shaft 38 which rotates in accordance with movement of the cam follower 18 which moves in correspondence to the cam 10 for controlling movement of the left-and-right direction at the driving mechanism A. At one end part of the shaft 38, there is integrally fitted a pinion 40 which is meshed with a rack 42 formed in the longitudinal direction of the rail member 26. Accordingly, the left-and-right moving block 28 moves in the designated direction along the rail members 26, 26 by the forward or reverse rotation of the shaft 36, or the pinion 40.

Further, the left-and-right moving block 28 is provided with a shaft 44 which rotates in accordance with movement of the cam follower member 20 which moves in correspondence to the cam 12 for controlling movement in the up-and-down direction. At one end of the shaft 44, there is integrally fitted a pinion 46 which is meshed with a rack teeth 48 formed in the longitudinal direction of one of the up-and-down moving levers 30. Accordingly, the up-and-down moving block 32 performs the up-and-down movement with respect to the left-and-right moving block 28 owing to the forward or reverse rotation of the shaft 44, or the pinion 46.

The up-and-down moving block 32 is provided with a rack bar 50 moving in the up-and-down direction in accordance with movement of the cam follower 22 which moves in correspondence to the cam 14 for controlling movement in the front-and-back direction, a pinion 52 meshed with the rack bar 50 and held in the front-and-back moving block 32, and a rack bar 34 meshed with the pinion 52 to move back and forth in the front-and-back direction. The front-and-back moving block 36 is mounted and held on the rack bar 34. Accordingly, the front-and-back moving block 36 performs the back and forth movement with respect to the up-and-down moving block 32 following the up and down movement of the rack bar 50 due to the cam follower member 22. Incidentally, the rack bar 34 which moves back and forth is so constructed that a piston 122 is provided at the rear end thereof, the piston 122 is fitted in a cylinder 124 formed in the front-and-back moving block 36 so as to be joined with the block 36, and a constant right-ward pressing force is exerted to the rack bar 34 by the piston 122 and the cylinder 124, whereby the cam follower member 22 is caused to be in constant contact with the cam 14.

A reference numeral 54 designates a rotational cylinder inserted and fitted in the up-and-down moving block 32 in parallel with the front-and-back moving rack bar 34, and a reference numeral 56 designates a spline shaft which is spline-fitted in and with the rotational cylinder 54. The rear end of the spline shaft 56 is connected with the front-and-back moving block 36 in a freely rotatable manner. A numeral 58 refers to an electric motor which is mounted and held on the lower surface of the up-and-down moving block 32. The motor 58 is associated with the rotational cylinder 54 through a sprocket 60 mounted on the rotational axis of the motor 58 and another sprocket 62 integrally formed at one end part of the rotational cylinder 54 by a connecting chain 64. By the forward or reverse rotation of the motor 58, the rotational cylinder 54, i.e., the spline shaft 56 can be forwardly or reversely rotated separate from the back and forth movement thereof by the front-and-back moving block 36. The welding torch T is fitted and held at the front end of the spline-shaft 56 through a holder 66.

In more detail, the welding torch T performs a predetermined three-dimensional locus movement by the composition of the relative movement of the block 28, 32 and 36, i.e., the left-and-right, up-and-down, and front-and-back moving blocks 28, 32 and 34 in the welding torch supporting and moving mechanism are relatively controlled their movement by the cam follower members 18, 20 and 22 which move in correspondence to the three profile cams 10, 12 and 14 for controlling the respective directions of left-and-right, up-and-down, and front-and-back in the driving mechanism A. In addition to this, the rotational posture of the welding torch T is controlled by the forward and reverse rotation controls of the motor 58 with the shaft 56 as the center of rotation.

One of the features of the present invention resides in that the movement of each of the cam follower members 18, 20 and 22 which correspondingly follow the profile cams 10, 12 and 14 in the driving mechanism of the automatic welding machine is transmitted to each of the left-and-right moving block 28, the up-and-down moving block 32 and the front-and-back moving block 36 of the torch supporting and moving mechanism (i.e., driven mechanism) corresponding respectively to each of the abovementioned profile cams through the universal joints 68, 82 and 95.

In the illustrated embodiment, the movement of the cam follower member 18 following movement of the cam 10 (for controlling left-and-right movement of the welding torch T) is converted into the forward and reverse rotational movement of a shaft 74 of a pinion 72 meshed with a rack teeth 70 formed along the longitudinal direction of the cam follower member 18, and the rotation of the shaft 74 is transmitted to the pinion shaft 38 of the pinion 40 meshed with the rack teeth 42 formed along the longitudinal direction of the left-and-right moving block 28 at the torch supporting and moving mechanism (driven mechanism) B through the universal joint 76, follower shaft 78, and universal joint 80. Accordingly, the block 28 moves in the left-and-right direction along the rail members 26, 26 by the vertical movement of the cam follower 18 following movement of the cam 10, i.e., the forward and reverse rotation of the pinion 40.

In the same manner, the movement of the cam follower 20 following the movement of the cam 12 (for controlling up and down movement of the welding torch T) is converted into the forward and reverse rotational movement of a pinion shaft 88 of the pinion 86 meshed with a rack teeth 84 formed along the longitudinal direction of the cam follower member 20, and the rotation of the shaft 88 is transmitted to the pinion shaft 44 through the universal joint 90, the follower shaft 92, and universal joint 94 to drive the up-and-down moving block 32 at the torch supporting and moving mechanism B. In other words, the rotation of the shaft 88 is transmitted to the pinion 46 rotatably supported in the left-and-right moving block 28 and meshed with the rack teeth 48 formed along the longitudinal direction of the up-and-down sliding lever 30. Accordingly, the block 32 moves in the up and down direction by the up-and-down movement of the cam follower member 18 following movement of the profile cam 12, i.e., the forward and reverse rotation of the pinion 68.

The vertical movement of the cam follower 22 following the movement of the profile cam 14 (for controlling fron-and-back movement of the wilding torch T) is transmitted to a rack bar 50 in such a manner that one end of a flexible cable 95 consisting of an outer tube 96 and an inner wire 98 is connected to the cam follower 22, and the other end is connected to the rack bar 50 which is incorporated in the up-and-down moving block 32 in a freely slidable manner. The rack bar 50 is meshed with a pinion 52 rotatably held within the up-and-down moving block 32. The pinion is further meshed with the fron-and-back moving rack bar 34 incorporated at its one end in the front-and-back moving block 36. Accordingly, the up-and-down movement of the cam follower 22 following the movement of the profile cam 14 is transmitted to the front-and-back moving block 36 through the flexible cable 95, rack 50, pinion 52, and rack 34, whereby the block 36 and the spline shaft 56 connected with the block 36 moves frontward and rearward.

As stated in the foregoing, since the automatic welding machine according to the present invention is so constructed that the driving force from the driving mechanism A is transmitted to the drive pinion shafts 38 and 44, and the rack bar 50 in the torch supporting and moving mechanism (or driven mechanism) B, through the respective universal joint mechanism 68, 82 and 95, the driven mechanism B can be relatively shifted in position with respect to the mechanism A within the flexible range of the universal joint mechanisms 68, 82 and 95.

As the consequence, a plurality of units of the welding machine of the same kind can be collectively gathered in a limited space in the torch supporting and moving mechanism B, and the torches T in the welding machines are arranged in mutually contiguous positional relationship, as shown in FIGS. 2 and 3. With such torch arrangement, it becomes possible to readily perform the multi-welding operations on a work piece where a plurality of portions to be welded concentrate on a very limited narrow region, and to effectively increase the operating speed of the welding line with a shortened welding time as a whole.

Incidentally, in FIGS. 2 and 3, reference numerals 100 (24) designate a common supporting frame for each welding machine; 102 a hydraulic pressure cylinder to constantly urge the movable block 28 in each welding machine in one direction to maintain the cam follower member 18 in contact with the cam 10 through the pinion 40, the shaft 38, the universal joint mechanism 68, the pinion 72, and the rack 70; and a numeral 104 refers to a hydraulic pressure cylinder to share the weight of the movable block 32 and associated parts therewith in each welding machine to smoothly perform the up-and-down movement of the movable block 32 by the rack bar 50.

In another aspect of the present invention to facilitate reinstatement of the cam to its original position or change-over of the profile cam from one to another in the welding machine of a type, in which the driven member is connected with the cam follower member which is in contact with the profile cam and follows its movement so as to be driven thereby, there has so far been used generally a spring or a weight as the means for constantly maintaining the contact between the cam and the cam follower. In this type of expedient, the cam follower is separated from the cam against force of the spring or gravity of the weight at the time of reinstatement of the cam to its original position, or change-over of the cam from one to another. Since, however, the separation is done manually, its working efficiency is poor. Therefore, aside from change-over of the cams, the cams at the time of their reinstatement to the original positions are in most cases inversely rotated, while keeping in contact with the cam follower members with the consequence that there takes place not infrequently such a situation that the driven member performs unnecessary movement during the reverse rotation of the cam to thereby interfere with the work piece and other objects. Also, since the returning speed is limited, no quick return can be realized.

The present invention aims at removing such disadvantage in the automatic welding machine of the above-described construction, according to which there is provided a hydraulic pressure cylinder to maintain contact between the profile cam and the cam follower member by constant pressing of the cam follower to the profile cam. At the time of reinstatement of the profile cam or its change-over, the hydraulic pressure cylinder is caused to operate in the reverse direction to separate the cam follower from the cam.

In the illustrated embodiment in FIG. 4, there are provided a set of three profile cams 9, 11 and 13 in addition to the set of three profile cams 10, 12 and 14, both sets of cams being coaxially arranged on the shaft 8 extending from the motor 8. These cams 10, 12, 14 and 9, 11, 13 are caused to slide-shift by the operation of a handle 23 so that the change-over operation of the profile cams with respect to the cam followers 18, 20 and 22 can be done readily.

Referring to FIGS. 3, 4 and 5, the hydraulic pressure cylinder 102 for constantly contacting the cam follower 18 to the profile cam 10 maintain the left-and-right movable block 28 in a substantially constant tension to the left-ward as viewed from the top surface of the drawing. By this tensioning of the hydraulic cylinder, there is constantly exerted a downward force to the cam follower 18 through universal joint mechanism consisting of the pinion 40, the pinion shaft 38, the universal joint 80, the follower shaft 78, the universal joint 76, the shaft 74, the pinion 72, and the rack teeth 70, whereby the cam follower 18 is constantly maintained in contact with the profile cam 10.

Constant contact force is imparted to the cam follower member 20 by the weight of the up-and-down moving block 32 and the associated parts therewith through the universal joint mechanism consisting of the rack teeth 48, the pinion 46, the pinion shaft 44, the universal joint 94, the follower shaft 92, the universal joint 90, the shaft 88, the pinion 86, and the rack teeth 84. The hydraulic cylinder 104 in FIG. 5 shares to support the weight of the movable block 32, which is considerably heavy for its purpose, to adequately adjust the contact pressure of the cam follower member 20 to the profile cam 12. At the same time, the hydraulic cylinder 104 functions to perform smooth upward movement of the up-and-down moving block 32. Incidentally, when the movable block 32 is so laid out that it may move in the left-and-right or front-and-back direction, the hydraulic cylinder 104 functions to cause the cam follower member 20 to constantly contact the cam 12.

In reinstating the cams 10, 12 and 14 to their respective original positions or changing them over, the abovementioned hydraulic pressure cylinders 102, 104 and 106 are inversely operated by changing over the hydraulic pressure to pull the cam followers 18, 20 and 22 away from the respective profile cams 10, 12 and 14 through the respective universal joint mechanisms consisting of the rack teeth 42, the pinion 40, the pinion shaft 38, the universal joint 80, the follower shaft 78, the universal joint 76, the shaft 74, the pinion 72, and the rack teeth (for the moving block 28); the rack teeth 48, the pinion 46, the pinion shaft 44, the universal joint 94, the follower shaft 92, the universal joint 90, the shaft 88, the pinion 86, and the rack teeth 84 (for the moving block 32); and the flexible cable 95 consisting of the outer tube 96 and the inner wire 98 (for the moving blocks 32 and 36). In this manner, the reinstatement of the cams to their original position, quick return to their designated position, or change-over from one to another cam can be effected smoothly. The reinstatement of the cams to their original positions can be automatized by detecting the terminating point of the cam rotation by a switch and other expedient, and feeding the detected signal back to a hydraulic pressure change-over mechanism of each of the hydraulic pressure cylinders 102, 104 and 106. Such automatic system is very effective for the profile cam device, in which the reinstatement of the cams to their original position, quick return of the cams to their designated position, and change-over of the cam from one to the other can be done easily.

In another aspect of the present invention, wherein the cam follower 22 which follows the movement of the profile cam 14 is connected to the driven member (rack bar) 50 through the inner wire 98 within the outer tube 96 of the flexible cable 95 to thereby transmit the forward and backward movement of the cam follower 22 to the driven member 50, there tends to occur such a trouble that, when the inner wire 98 is pushed by the cam follower 22 in the direction of pushing the driven member (rack bar) 50, the rigidity of the inner wire 98 is sometimes defeated by the load at the side of the driven member 50 to cause the so-called buckling of the inner wire. As the consequence of this buckling of the inner wire, the lifting quantity of the cam 14 cannot be accurately transmitted to the side of the rack bar 50.

In order to prevent the flexible cable 95 from buckling, the present invention proposes to provide a tensioning mechanism 106 which constantly pulls the cam follower 22 toward the profile cam 14 with a vertical force $F_1$ to maintain contact therewith, and to also provide another tensioning mechanism 130 which pulls the rack bar (or driven member) 50 in the direction opposite to the abovementioned cam follower 22 with a force $F_2$ which is smaller than $F_1$, thereby imparting a constant tension to the inner wire 98 connecting the cam follower 22 and the driven member (rack bar) 50.

For the tensioning mechanism 106 which constantly pulls the cam follower member 22 to the profile cam 14, the embodiment of the present invention as illustrated in the drawing uses the hydraulic pressure cylinder which is so constructed that a piston rod 108 of the hydraulic pressure cylinder 106 is integrally combined with the cam follower 22, and a hydraulic pressure in the direction to push down the piston 112 under a constant pressure is introduced into the cylinder 110 through a port 114 so that the force $F_1$ is constantly urged to the cam follower member 22 to press-contact it to the profile cam 14. In this case, when the upwardly moving force is acted on the cam follower 22 with rotation of the cam 14, the internal pressure of the cylinder 110 increases. In order, however, to avoid abnormal internal pressure to occur within the cylinder, the fluid in the cylinder corresponding in quantity to the pressure increase flows out of the cylinder 110 through a port 116 and a check valve 118. In this way, the cam follower 22 rises upward to actuate the rack bar 50 without trouble whatsoever, while maintaining intimate contact with the cam 14 with the force $F_1$.

Also, for the tensioning mechanism 130 which pulls the rack bar 50 in the direction opposite to the abovementioned tensioning mechanism 106 with the force $F_2$ which is smaller than the force $F_1$, there is used the hydraulic pressure cylinder of the same kind as the abovementioned one. That is, for this purpose, a cylinder room 132 is formed within the up-and-down moving block 32, into which a piston 134 is inserted, and a rack 34 is connected to the piston 134 as an integral part thereof. And, by constantly introducing a fluid under a constant pressure into the cylinder 132 through a port 136, the piston 134 is pushed rearward (or, in the retracting direction of the piston 134) to constantly pull the driven member 50, i.e., the rack bar 50, through the piston 134, the rack 34 and the pinion 52 with the force $F_2$ which is smaller than the force $F_1$. In this case, the cam follower 22 rises upward with rotation of the profile cam 14, and the advancing force acts upon the movable block 36 through the inner wire 98, the rack bar 50, the pinion 52, and the rack 34 with the consequence that the piston 134 also advances to increase the internal pressure in the cylinder 132. However, as the fluid in a quantity corresponding to the internal pressure increase flows out of the cylinder 132 through the port 138 and the check valve 140, hence the piston 134 smoothly advances without causing hindrance to the forward movement of the movable block 36.

In other words, when the inner wire 98 of the flexible cable 95 connecting the cam follower member 22 and the rack bar 50 is brought into a constantly tensioned state, there is no possibility of the rigidity of the inner wire 98 being defeated by the load applied to the side of the driven member (rack bar) 50 when the inner wire 98 is pushed toward the pushing direction of the driven member 50 by the cam follower member 22, so that the buckling of the flexible cable can be effectively prevented.

By the way, in place of the hydraulic pressure cylinder as illustrated, spring means may be employed for the tensioning mechanisms 106 and 130 for the cam follower member 22 and the driven member 50, respectively. However, when the hydraulic pressure cylinder is utilized, the cam follower member can be easily escaped or separated from the cam by the operation of the hydraulic pressure cylinder at the time of change-over of the cam, which is highly convenient.

Also, in the illustrated embodiment, the constant pulling mechanism is provided in each of the cam followers 18 and 20 for the cams 10 and 12, although it is not shown in the drawing.

According to further embodiment of the automatic welding device according to the present invention, it is contemplated to facilitate escapement of the welding torch from a work piece for welding, when necessary, by arbitrarily operating back and forth only a part of the front-and-back moving block directly supporting the welding torch T irrespective of the automatic program control at the side of the driving mechanism A. That is to say, the device is so constructed that a second front-and-back moving member supporting the welding torch is coupled with a first front-and-back moving member at the side of the driven mechanism in a manner to freely determine the sliding position thereof in the front and rear direction.

Generally, when a work piece is to be automatically welded, it becomes necessary sometimes that the welding torch is once removed away from the work piece depending on its configuration in the course of the welding operation, after which the welding is taken up again. In this instance, it has so far been the practice to previously include in the operating program for the driving mechanism the locus of escapement of the welding torch from the work piece with the consequent disadvantage such that the overall welding time becomes relatively prolonged. Also, in the case of using profile cams as the programming means, when the locus of escapement of the welding torch is programmed, the shape of the cam becomes complicated and manufacture of such cam requires much skill. Moreover, at the time of setting the work piece, the welding torch must be taken away from its position to facilitate setting of the work piece. For this purpose, the welding machine as a whole or the entire driven mechanism supporting the welding torch are generally caused to move. On account of this moving mechanism, however, the welding machine as a whole becomes large-sized, complicated in construction, and expensive in its manufacturing cost.

More specifically, the automatic welding machine according to the present invention is so constructed that, in the driven mechanism B, the front-and-back moving block 36 as the second front-and-back moving member is coupled with the rack bar 34 as the first front-and-back moving member in a manner to freely determine the sliding position of the former to the latter in the front-and-back direction. More concretely, the illustrated embodiment provides a piston 122 at the rear end of the rack bar 34, inserts the piston 122 into a cylinder 124 formed in the front-and-back moving block 36 and then causes a hydraulic pressure a to act, through a port 126, on one side of the cylinder chamber where the piston 122 faces inside. By this arrangement, the front-and-back moving block 36 is advanced in the direction of the up-and-down moving block 32 along the rack 34. On the other hand, by causing a hydraulic pressure b to act on the other side of the cylinder chamber through a port 128, the movable block 36 can be moved backward in the opposite direction away from the up-and-down moving block 32 along the rack 34.

Also, at the time of the welding operation, the hydraulic pressure a is caused to act constantly in the cylinder 124 through the port 126 to sufficiently advance the front-and-back moving block 36 along the rack bar 34 until the end face of the cylinder 124 contacts the end face of the piston 122, while continuing the hydraulic pressure a to act in the cylinder to maintain the rack bar 34 and the block 36 in an integral state. By so doing, the front-and-back moving block 36 moves in association with the rack bar 34 by the power mechanism consisting of the cam 14, the follower 22, the flexible cable 95, and the rack bar 50 to perform the welding operation without trouble.

On the other hand, when the welding torch is to be taken away from the work piece W in the course of the welding operation, or the work piece is to be set in the welding position, the hydraulic pressure a in the cylinder chamber 124 is released, and the hydraulic pressure b is caused to act to the other side of the cylinder chamber through a port 128. By this hydraulic pressure b, the block 36 moves backward in the direction away from the up-and-down moving block 32 along the rack bar 34, along with which the spline shaft 56 also moves backward to readily retract the welding torch T from the work piece. When the welding torch T is again to be brought back to the welding position of the work piece W, the hydraulic pressure is released, and the hydraulic pressure a is again caused to act on the cylinder 124 through the port 126.

Incidentally, when the back pressure is acted on the cylinder 120 to cause the front-and-back moving block 36 to move backward along the rack bar 34, there is acted a force on the piston 122, i.e., the rack bar 34 in the forwarding direction thereof. However, since the rack bar 34 is engaged with the driving system consisting of the cam 14, the cam follower member 22, the flexible cable 95, and the rack bar 50, through the pinion 52, and, at the same time, is always applied with a force in the backward direction which stretches the wire 98 by the hydraulic pressure cylinder 104, the rack bar 34 is not moved by the abovementioned back pressure b, and the front-and-back moving block 36 alone retracts along the rack bar.

As stated in the foregoing, according to the present invention, the welding torch can be easily removed from the work piece W when it is necessary, with a simple construction, which is effective as an improvement in the automatic welding machine.

Figure 6:
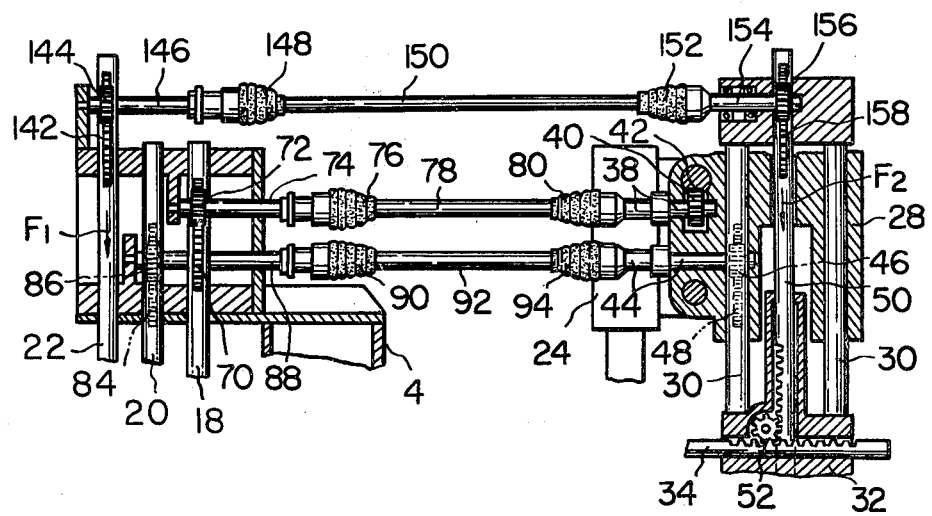
FIG. 6 is a side elevational view partly in cross-section of still another embodiment according to the present invention.

As a further embodiment of the automatic welding machine according to the present invention, as shown in FIG. 6, instead of using the flexible cable 95 for the power transmission from the driving section to the driven section to move the front-and-back moving block 32, there can also be used the universal joint mechanism consisting of a rack teeth 142 formed in the cam follower member 22 in intimate contact with the profile cam 14, a pinion 144 meshed therewith, a follower shaft 146, a universal joint 148, a follower shaft 150, another universal joint 152, a drive shaft 154, another pinion 156, and a rack teeth 158 formed in the rack bar (or driven member) 50 to be meshed with the pinion 156. With this construction, trouble such as buckling of the inner wire 98 in the flexible cable 95 can be successfully avoided, and intimate contact between the cam follower 22 and the profile cam 14 can be secured without difficulty. In adopting this universal joint mechanism for this front-and-back moving block, as is the case with the other moving blocks for the left-and-right and up-and-down movement, the legth of the rack bar 50 should be made sufficiently long to enable the rack teeth 158 to be properly meshed with the pinion 156.

Numerous variations in the construction of the device of this invention, within the scope of the appended claims, will become apparent to those skilled in the art in the light of the foregoing disclosure. Merely by way of illustration, the device can be differently oriented, with the railing members 26 vertical, for example. The movable members can also be differently arranged with respect to one another, so long as they permit universal 3-dimensional movement of the torch. These are merely illustrative.

What is claimed is:

1. An automatic welding machine of a type, wherein a welding torch is subjected to predetermined three-dimensional locus motions by means of three profile cams for controlling movement of the torch in the left-and-right, up-and-down, and front-and-back directions in accordance with predetermined programs set in the machine, which comprises in combination:
   (a) a driving section including:
      (1) a frame to support component members thereon;
      (2) a shaft rotatably held on said frame;
      (3) an electric motor axially fitted at one end of said shaft;
      (4) a plurality of profile cams fixedly provided on the other end part of said shaft to be rotated therewith, said profile cams being arranged with an appropriate space interval between them;
      (5) cam follower members corresponding in number to said profile cams and intimately contacted therewith to move in accordance with rotational movement of said profile cams; and
      (6) a plurality of power transmission means operatively connected to said cam follower members to transmit the driving force from each of said cam follower members in said driving section to movable members; and
   (b) a driven section including:
      (1) a frame to support component members thereon;
      (2) a plurality of movable members connected to respective ones of said power transmission means, including three members which move in response to driving force transmitted from respective ones of said profile cams via cam follower members in said driving section, one of said three members being movable in the left-and-right direction, another of said three members being movable in the up-and-down direction and the last of said three members being movable in the front-and-back direction, a first of said three members carrying a second of said three members, the second of said three members carrying a third of said three members, the third member constituting a torch-carrying movable member;
      (3) a welding torch carried by said torch-carrying movable member, said torch being carried by a rotatable cylindrical member carried by said torch-carrying movable member; and
      (4) an electric motor to tilt said torch through a linking means extended between said motor and said rotatable cylindrical member.

2. The automatic welding machine as set forth in claim 1, in which said power transmission means for said movable members comprises gear means, drive power follower shafts, and universal joints.

3. The automatic welding machine as set forth in claim 1, in which there is further provided a hydraulic pressure cylinder to maintain said cam follower member for said movable member moving in the left-and-right direction to constantly push said profile cam to secure intimate contact between said cam follower member and said profile cam so that said cam follower member may be separated from said profile cam by inversely operating said hydraulic pressure cylinder at the time of returning of said profile cam to its original position, or changing over of said cam from one to the other.

4. The automatic welding machine as set forth in claim 1, in which said front-and-back movable member is the torch-carrying member and said torch is mounted on a shaft slidably mounted on said front-and-back movable member for sliding relative to said front-and-back movable member in parallel with said front-and-back movable member.

5. The automatic welding machine as set forth in claim 1, in which there is further provided a hydraulic pressure cylinder to share the weight of said movable member moving in the up-and-down direction and other members associated therewith to adequately adjust contact pressure of said cam follower for said movable member to said relevant profile cam, and to secure smooth upward movement of said up-and-down movable member.

6. The automatic welding machine as set forth in claim 1, in which said power transmission means for said movable member moving in the up-and-down direction comprises a flexible cable composed of an outer tube and an inner wire inserted in said outer tube and connecting at both ends thereof said cam follower member in said driving section and said movable member in said driven section.

7. The automatic welding machine as set forth in claim 6, wherein there are further provided a pulling mechanism on said cam follower member to constantly pull said cam follower toward said profile cam, and a tensioning mechanism to impart a tension to any of the movable member in said driven section with a force which is smaller than the force imparted to pull said cam follower member toward said cam and in the direction opposite to the pulling direction, thereby imparting a constant tension to said inner wire connecting said cam follower member and said movable member.

* * * * *